United States Patent
Bochen

(10) Patent No.: US 10,320,182 B2
(45) Date of Patent: Jun. 11, 2019

(54) SAFETY CIRCUIT FOR A ROTARY DRIVE

(71) Applicant: Stabilus GmbH, Koblenz (DE)

(72) Inventor: Marian Bochen, Eitelborn (DE)

(73) Assignee: Stabilus GMBH, Koblenz (DE)

( * ) Notice: Subject to any disclaimer, the term of this patent is extended or adjusted under 35 U.S.C. 154(b) by 4 days.

(21) Appl. No.: 15/484,289

(22) Filed: Apr. 11, 2017

(65) Prior Publication Data

US 2017/0302067 A1 Oct. 19, 2017

(30) Foreign Application Priority Data

Apr. 15, 2016 (DE) .......................... 10 2016 206 415

(51) Int. Cl.
| | |
|---|---|
| H02P 6/08 | (2016.01) |
| H02P 6/15 | (2016.01) |
| H02P 9/02 | (2006.01) |
| H02H 7/08 | (2006.01) |
| E05F 15/611 | (2015.01) |
| E05F 15/622 | (2015.01) |
| B60J 5/10 | (2006.01) |
| H02P 3/06 | (2006.01) |
| B62D 25/10 | (2006.01) |

(52) U.S. Cl.
CPC ............ *H02H 7/0822* (2013.01); *B60J 5/101* (2013.01); *E05F 15/611* (2015.01); *E05F 15/622* (2015.01); *H02P 3/06* (2013.01); *B62D 25/105* (2013.01); *E05Y 2400/20* (2013.01); *E05Y 2900/531* (2013.01)

(58) Field of Classification Search
USPC ...................... 318/563, 363, 538, 11, 55, 648
See application file for complete search history.

(56) References Cited

U.S. PATENT DOCUMENTS

| | | | | |
|---|---|---|---|---|
| 8,508,170 B2 * | 8/2013 | Bochen | ................ | E05F 15/622 |
| | | | | 318/266 |
| 2005/0184699 A1 * | 8/2005 | Unno | ...................... | H02P 1/423 |
| | | | | 318/786 |
| 2016/0278176 A1 * | 9/2016 | Chen | .................... | H05B 39/044 |

FOREIGN PATENT DOCUMENTS

| | | | | |
|---|---|---|---|---|
| DE | 20 2005 007 155 | | 10/2006 | |
| DE | 10 2007 054 448 | | 3/2009 | |
| DE | 102009042456 A1 * | 9/2011 | ............ E05F 15/622 |
| DE | 10 2009 042 456 | | 6/2013 | |
| JP | 05207647 A * | 8/1993 | |

* cited by examiner

*Primary Examiner* — Eduardo Colon Santana
*Assistant Examiner* — Charles S Laughlin
(74) *Attorney, Agent, or Firm* — Rankin, HIll & Clark LLP

(57) ABSTRACT

Safety circuit for a rotary drive, in particular for a vehicle hatch, which circuit has a braking effect on the rotary drive when the rotary drive is deactivated and external forces are applied to the hatch from the outside, the rotary drive comprising at least one electric motor, the winding of which can be short-circuited by at least one triac, in which just one triac is provided between the connections of the winding, the gate of which triac is connected to one of the connections by two Zener diodes that are connected in series in an anti-parallel manner.

4 Claims, 3 Drawing Sheets

SAFETY CIRCUIT FOR A ROTARY DRIVE

The invention relates to a drive device, in particular for a vehicle hatch, comprising a housing tube that can be connected to a base part or to a movable component, a protective tube that can be connected to the movable component or to the base part, a spindle drive comprising a threaded spindle and a spindle nut arranged on the threaded spindle, by means of which drive the housing tube and the protective tube can be moved axially relative to one another, and a rotary drive that rotatably drives the spindle drive and comprises at least one electric motor.

Many variations of drive devices of this type are known. They are used in particular in motor vehicles for example in order to close and open bonnets, tailgates, boot lids, doors and similar pivotable elements. A generic drive device is known from DE 10 2007 054 448 B3 by the applicant, for example. In addition to the motor assembly, the drive unit of drive devices of this type usually also has a gear assembly, which gears down the rotational movement of the motor assembly and transfers this rotational movement to an adjustment assembly of the drive device, for example a spindle drive. However, these drives are disadvantageous because they are loaded with high forces during manual operation or as a result of manual intervention during automatic operation. In individual cases, the externally introduced forces may exceed the usual, application-related forces in the drive system many times over, meaning that various components of the drive devices may be damaged.

Furthermore, DE 20 2005 007 155 U1 discloses an adjustment system in which a brake inserted between the electric motor and a gear provides a braking effect, which can be overcome both by force being manually applied to the tailgate and by electromotive force from the electric motor. This is achieved by the torque output by the electric motor being transmitted to the gear, minus a small amount of friction from the brakes. This has the drawback that the brakes are constantly subjected to wear.

The prior art closest to the present invention is DE 10 2009 042 456 B4 by the applicant. This document already discloses a rotary drive comprising a drive device, the drive device having a safety circuit which brings about a braking effect on the rotary drive when the rotary drive is deactivated and external forces are introduced into the drive device from the outside if a threshold rotational speed is exceeded.

In order to save installation space in the drive device and to simplify assembly, the safety circuit can be arranged in the housing tube on an electronic circuit board that is allocated to a rotational-speed and rotational-direction sensor system, the safety circuit operating independently of the rotational-speed and rotational-direction sensor system and the electrical signals therefrom.

Alternatively, the safety circuit may be arranged in a supply line or in a plug of the supply line of the drive device.

The safety circuit comprises at least one triac, by means of which the winding of the electric motor can be continuously short-circuited, thus preventing unpleasant jerking, which also has a detrimental effect on the installed components, since a triac only interrupts the circuit if the load current or the short circuit current generated by the electric motor is zero.

According to this prior art document, a significant number of components (at least two triacs and two Zener diodes or one triac, one Zener diode and four diodes) are required in order to produce the safety circuit according to the invention. Since this safety circuit has to be arranged within the existing housing, printed circuit boards or wiring, and cable compartments, it is absolutely necessary to reduce the number of components required. In particular, only one triac, which, as a component of the power electronics, requires a particularly large amount of space and possibly also cooling equipment, should preferably be used.

Proceeding from this prior art document, the problem addressed by the present invention is therefore to develop a generic safety circuit such that only a minimal number of electronic components, and in particular only one triac, are required to produce the safety circuit, without the functionality of the safety circuit being impaired in any way.

According to the invention, this problem is solved in a generic safety circuit in that just one triac is provided between the connections of the winding of the rotary drive, the gate of which triac is connected to one of the connections by two Zener diodes that are connected in series in an anti-parallel manner.

In addition, a resistor can be provided in series with the Zener diodes in order to set the tripping point of the safety circuit more precisely. This resistor may for example be adjustable (potentiometer) or temperature-dependent (in the form of a PTC or NTC resistor).

In the above manner, the tripping characteristics of the safety circuit can be configured to be temperature-dependent.

In the following, the present invention will be described in greater detail on the basis of the figures below, in which.

Figure 1:
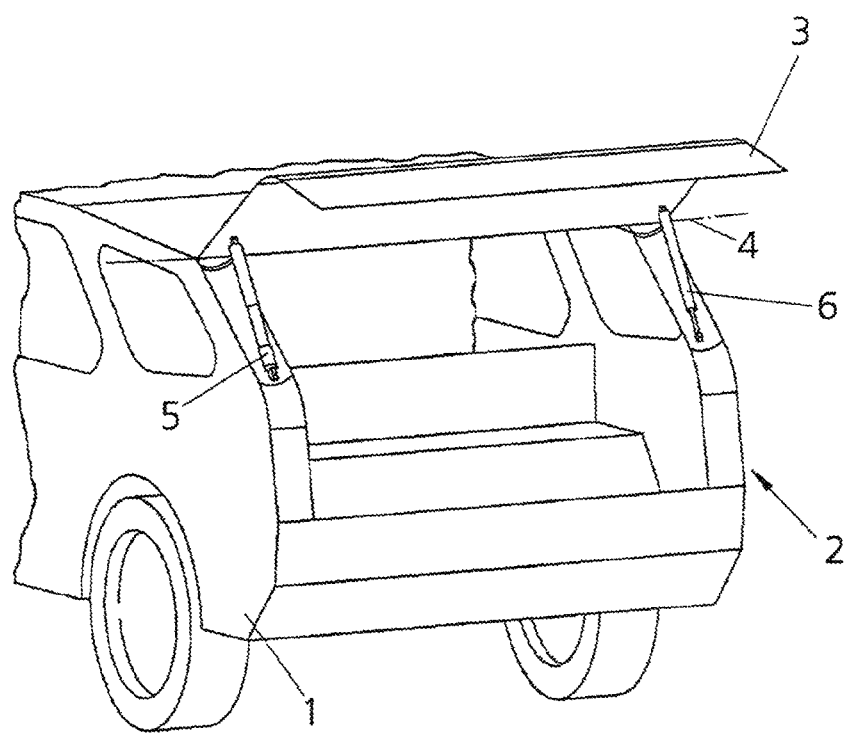
FIG. 1 is a schematic view of a motor vehicle comprising a pivotally driven tailgate.

FIG. 1 is a schematic view of a motor vehicle comprising a body as the base part 1 and a movable component 3 that closes or opens an opening 2 in the base part 1 and is designed as a tailgate.

It is noted that that the component that is movable relative to the base part 1 may also be a bonnet, or a vehicle door, or may have a corresponding use.

The movable component 3 is mounted on a horizontal pivot axis 4 extending transversely to the vehicle. A first drive device 5 is arranged on one side of the movable component 3, and a second drive device 6 is arranged on the opposite side of the hatch 3.

Figure 2:
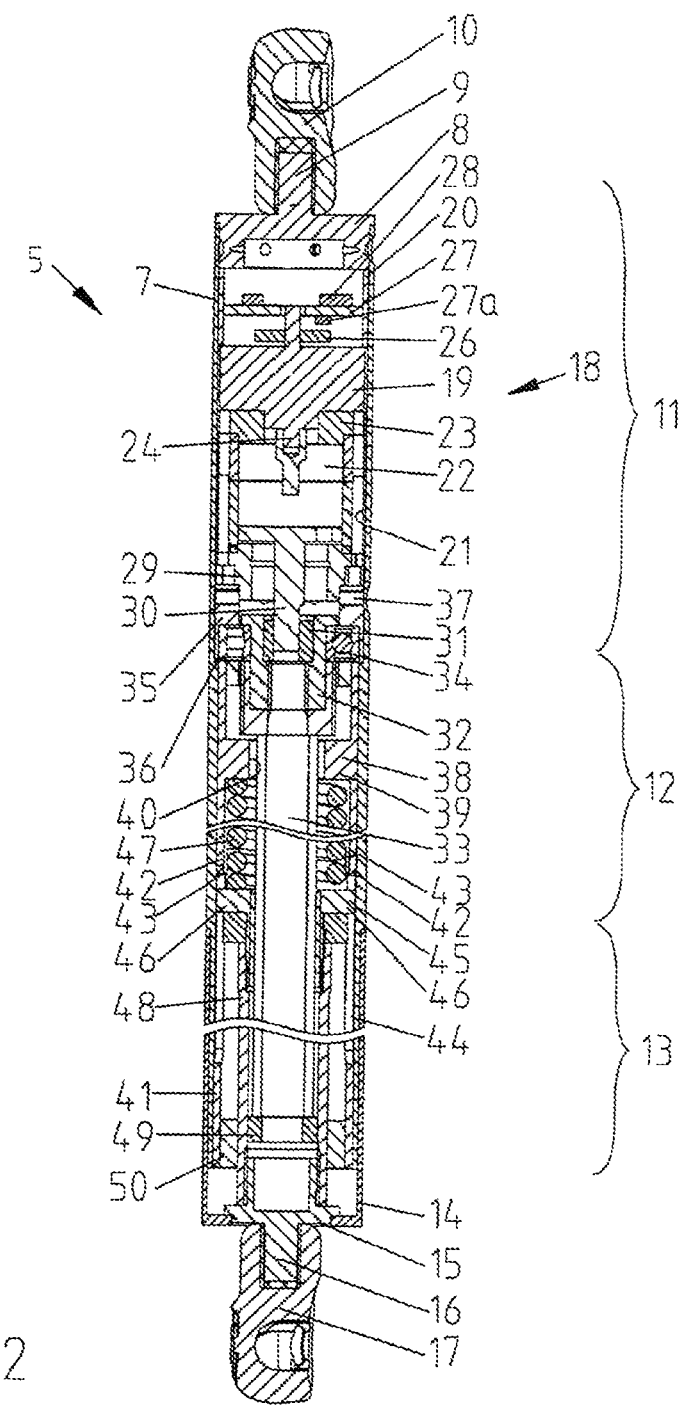
FIG. 2 is a cross section through a drive device.

FIG. 2 shows an embodiment of one of the two drive devices in the form of an electromechanical drive device, which is assigned as the first drive device 5 in the following description for the sake of simplicity. The second drive device 6 may likewise be an electromechanical drive device, or alternatively may be a pneumatic spring, as shown in FIG. 1.

The first drive device 5 has a housing tube 7, which is closed at one end by a base plate 8. The base plate 8 comprises a threaded pin 9, to which a connection element 10 is screwed.

The housing tube 7 comprises a first portion 11, a second portion 12 and a third portion 13. At a constant external diameter, the first portion 11 has a larger internal diameter than the second portion 12. At a constant internal diameter, by contrast the third portion 13 has a smaller external diameter than the second portion 12.

A protective tube 14, of which the external diameter substantially corresponds to the external diameter of the second portion 12 of the housing tube 7, is arranged over the third portion 13 of the housing tube 7. The protective tube 14 is closed by a base plate 15 at its end remote from the housing tube 7. The base plate 15 comprises a threaded pin 16, to which a connection element 17 is screwed. By means of the connection elements 10 and 17, the first drive device 5 can be hingedly connected to a stationary body component or base part 1 of a motor vehicle and to a movable component 3 of the motor vehicle designed as a hatch.

A rotary drive 18 is arranged in the interior of the housing tube 7, in the region of the first portion 11. The rotary drive 18 comprises an electric motor 19, a sensor device housed in a sensor housing 20 and a gear 22 housed in a gear housing 21. The electric motor 19 is supported by the sensor housing 20 at the end of the housing tube 7 that is closed by the base plate 8. The gear housing 21 is supported on the electric motor 19 by an adapter element 23. The gear 22 arranged in the gear housing 21 is driven by a motor drive shaft 24. The motor drive shaft 24 also projects into the sensor housing 20 on the side opposite the gear housing 21. The connection lines (not shown) that comprise power-supply and control lines extend from the sensor housing 20, through the base plate 8 and out of the housing tube 7, by means of which connection lines the electric motor 19 can be connected to a power source (not shown), in particular a car battery or a control device.

The motor drive shaft 24 projecting into the sensor housing 20 supports a permanent magnet 26, which is axially opposite an electronic circuit board 27 that is fixedly attached to the sensor housing 20 or alternatively to the housing tube 7 close to the free end of the motor drive shaft 24. The electronic circuit board 27 comprises at least one Hall element 27a of a rotational-speed and rotational-direction sensor system on the side facing the permanent magnet 26. A safety circuit 28 according to the invention is arranged on the side of the electronic circuit board 27 facing away from the permanent magnet 26.

The gear housing 21 is closed on the side opposite the electric motor 19 by a housing cover 29, through which a gear shaft 30 extends. The end of the gear shaft 30 is connected to a spindle drive. For this purpose, an adapter insert 31, on which a spindle adapter 32 is arranged, is positioned at the end of the gear shaft 30. A threaded spindle 33 is connected to the gear shaft 30 by the adapter insert 31 and the spindle adapter 32.

The spindle adapter 32 is mounted in a bearing 34. The bearing 34 is in turn arranged in a bearing sleeve 35, which is supported on one side on the gear housing 21 or the housing cover 29 and rests on a shoulder 36 formed by the differing internal diameters of the portions 11 and 12 on the other side. Therefore, the rotary drive 18 is secured within the first portion 11 of the housing tube 7 in the axial direction together with the bearing 34 of the threaded spindle 33. Parts of the rotary drive 18 can be connected to the housing tube 7 by means of screws 37 or catches such that they cannot twist relative to the housing tube 7.

A spring sleeve 38 is supported on the bearing 34 or the bearing sleeve 35, such that it substantially rests on the interior wall of the housing tube 7 in the second portion 12. Inside the spring sleeve 38, a wall 39 comprising a hole 40 is formed, through which the threaded spindle 33 protrudes. The spring sleeve 38 is extended, starting from the second portion 12 of the housing tube 7, towards the third portion 13 as far as the end of the housing tube 7 by a guide tube 41. At its end close to the guide tube 41, the spring sleeve 38 comprises recesses 42 in which projections 43 formed on the end of the guide tube 41 close to the spring sleeve 38 engage and therefore prevent the spring sleeve 38 and the guide tube 41 from being able to twist relative to one another. The guide tube 41 also comprises at least one guide device 44 which is formed as a slot, extends in the axial direction and into which a projection 46 formed on a spindle nut 45 protrudes.

A spring element 47 surrounding the threaded spindle 33 in part extends from the side of the wall 29 facing away from the bearing 34 towards the third portion 13 of the housing tube 7 and comes to rest on the spindle nut 45 that runs on the threaded spindle 33, in particular when the first drive device 5 is retracted, i.e. when the hatch 3 is in its almost completely closed position. When the hatch 3 is opened out of its completely closed position, the spring element 47 attempts to urge the spindle nut 45 away from the wall 39, and therefore supports the rotary drive 18 at least over the first few centimeters of the opening movement of the hatch.

A spindle tube 48 is axially movably guided in the guide tube 41 by means of the spindle nut 45, the spindle tube 48 being supported on the spindle nut 45 at one end and being attached to the base plate 15 of the protective tube 14 at its other end. On its end close to the base plate 15, the threaded spindle 33 comprises a guide ring 49 arranged in the spindle tube 48, meaning that the threaded spindle 33 is prevented from oscillating radially.

Another guide ring 50 is arranged between the spindle tube 48 and the end of the housing tube 7 close to the connection element 17, and likewise prevents the telescopically extendable components from oscillating radially and provides robust protection against kinking.

Figure 3:
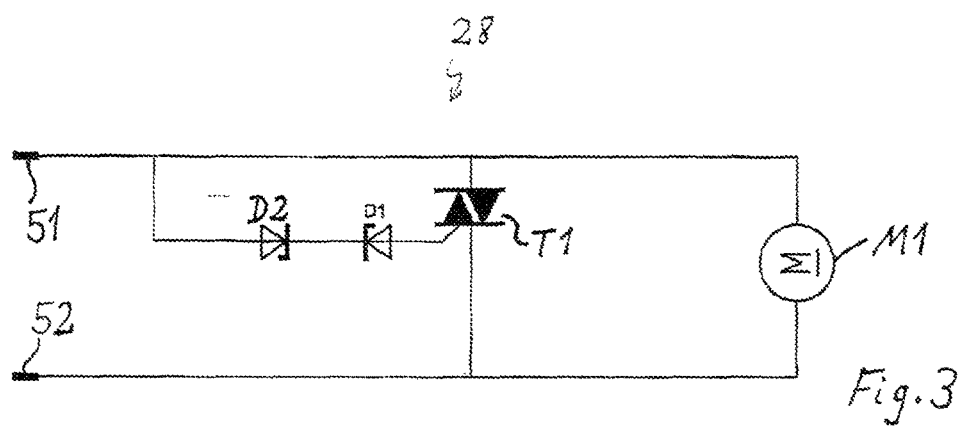
FIG. 3 shows an embodiment of the safety circuit of the present invention.

FIG. 3 is a circuit diagram of a first embodiment of the safety circuit 28 according to the invention. The winding of an electric motor M1 is connected to the connection contacts 51 and 52. These two connections may be connected to a suitable control device, for example, by means of which the electric motor M1 is actuated and supplied with power. A triac T1 is connected in parallel with the winding of the motor M1. The gate of the triac T1 is connected to one of the connections 51 or 52 by two Zener diodes D1 and D2 that are connected in series in an anti-parallel manner.

Here, the present invention makes use of the property of the triac whereby it can operate in both current directions and it can be switched in both directions by control currents. Owing to the Zener diodes D1 and D2 being connected in series in an anti-parallel manner, the supply of current to the gate of the triac T1 is shut off in each current direction. Only when the voltage exceeds the breakdown voltages of the Zener diodes is the triac T1 connected through irrespective of the current direction and thus of the polarity of the current generated by the winding of the motor M1 by an external load, by the Zener diode operated in the shut-off direction in the relevant current direction becoming conductive, while the Zener diode operated in the transmitting direction is already conductive in any case. Once the triac T1 becomes conductive, it short-circuits the winding of the motor M1, meaning that this acts as a motor brake until the hatch has stopped moving, since the triac triggered once remains conductive until the current has stopped flowing through the triac. Only then does the triac shut off again and the electric motor thus completes its braking operation. In this way, following a movement due to external forces and following a threshold speed being exceeded, it is ensured that the hatch has stopped moving completely before the braking effect ceases, and before the hatch can be actively moved again by the electric motor M1.

As can be seen from the circuit diagram in FIG. 3, the inventive wiring of the winding of the motor M1 is optimised in terms of the number of components required. By contrast with the prior art, just one triac and two Zener diodes are required. As a result, manufacturing costs are considerably lower, but in particular space is saved at the various installation sites.

Figure 4:
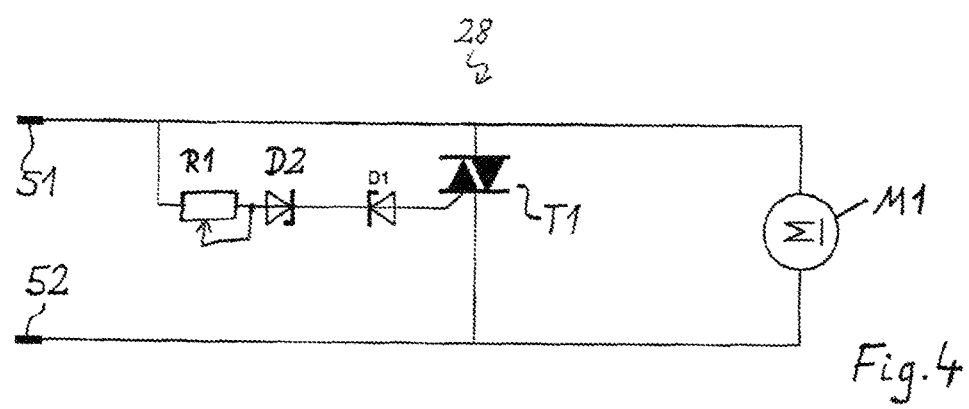
FIG. 4 shows another embodiment of the safety circuit according to the present invention.

FIG. 4 shows another embodiment of the present invention. In this figure, a resistor R1 is again connected in series in addition to the two anti-parallel Zener diodes D1 and D2. The resistor R1 may be a simple ohmic resistor, but preferably an adjustable resistor (potentiometer) R1 is selected, or a resistor having a positive or negative temperature coefficient. In this way, the tripping force for the safety circuit can be precisely set by the former or can be configured to be temperature-dependent by the latter. This allows significant additional degrees of freedom when designing the safety circuit.

According to the invention, the safety circuit can thus be simplified and reduced in size such that it can also be arranged on the existing circuit board of the motor, on or in the motor, or on or in the plug, depending on where installation space is still available.

LIST OF REFERENCE SIGNS 1 base part
2 opening
3 hatch
4 pivot axis
5 first drive device
6 second drive device
7 housing tube
8 base plate
9 threaded pin
10 connection element
11 first portion
12 second portion
13 third portion
14 protective tube
15 base plate
16 threaded pin
17 connection element
18 rotary drive
19, M1 electric motor
20 sensor housing
21 gear housing
22 gear
23 adapter element
24 motor drive shaft
26 permanent magnet
27 electronic circuit board
27a Hall element
28 safety circuit
29 housing cover
30 gear shaft
31 adapter insert
32 spindle adapter
33 threaded spindle
34 bearing
35 bearing sleeve
36 shoulder
37 screw
38 spring sleeve
39 wall
40 hole
41 guide tube
42 recess
43 projection
44 guide device
45 spindle nut
46 projection
47 spring element
48 spindle tube
49 guide ring
50 guide ring
51 first connection contact
52 second connection contact
T1 triac
R1 resistor
D1 Z diode
D2 Z diode

The invention claimed is:

1. A safety circuit for a rotary drive for a vehicle hatch, which circuit has a braking effect on the rotary drive when the rotary drive is deactivated and external forces are applied to the hatch from the outside, the rotary drive comprising at least one electric motor, a winding of which can be short-circuited by at least one triac,
   wherein just one triac is provided between one or more connections of the winding, a gate of which triac is connected to one of the connections by two Zener diodes that are connected in series in an anti-parallel manner,
   wherein a resistor is also connected in series with the Zener diodes in order to set a tripping point of the safety circuit,
   wherein one of the connections of the winding of the electric motor is connected in series to the resistor, followed by the two Zener diode anti-parallel configuration, which is also connected to the gate of the triac,
   wherein the resistor has an adjustable resistance value.

2. Safety circuit according to claim 1, wherein the safety circuit is arranged in a housing tube on an electronic circuit board.

3. Safety circuit according to claim 1, wherein the safety circuit is arranged on an existing circuit board of the motor.

4. Safety circuit according to claim 1, wherein the safety circuit is arranged in the motor.

* * * * *